United States Patent [19]

Skotheim

[11] 4,352,868
[45] Oct. 5, 1982

[54] DOUBLE PHOTOELECTROCHEMICAL CELL FOR CONVERSION OF SOLAR ENERGY TO ELECTRICITY

[76] Inventor: Terje Skotheim, IFM, University of Linköping, 581 83 Linköping, Sweden

[21] Appl. No.: 208,059

[22] Filed: Nov. 18, 1980

[51] Int. Cl.³ .............................................. H01M 6/36
[52] U.S. Cl. ..................................................... 429/111
[58] Field of Search ......................................... 429/111

[56] References Cited

U.S. PATENT DOCUMENTS 4,011,149  3/1977  Nozik .................................. 204/129
4,217,402  8/1980  Rod et al. ............................ 429/111

OTHER PUBLICATIONS

J. M. Bolts et al., "A Double Photoelectrode-Based Cell for the Conversion of Light to Electricity: p-Type CdTe and n-Type CdSe Photoelectrodes In a Polysulfide Electrolyte," *J. Am. Chem. Soc.*, vol. 99, pp. 4826–4827, (1977).

*Primary Examiner*—Aaron Weisstuch
*Attorney, Agent, or Firm*—Roland Plottel

[57] ABSTRACT

A double photoelectrochemical cell for converting solar energy directly to electricity. The device in one embodiment has two semiconductors which are separated from each other by a polymer electrolyte. The two semiconductors have a different band gap; for example, one is n-type CdS and the other is p-type CdTe. The polymer electrolyte, for example, is a thin film polyethylene oxide acting as a polymer matrix containing a polysulfide redox couple, for example, $Na_2S_4$. The polymer electrolyte is transparent, insulating, and capable of transporting ions. At least one of the semiconductors is semi-transparent. The short wavelengths of light are absorbed by the semi-transparent wide band gap semiconductor, and the long wavelengths pass therethrough, and through the polymer film electrolyte, and are absorbed by the narrow band gap semiconductor. The output of the cell is double; one from each semiconductor, i.e. they are series-connected. Output voltage, for example, is about 0.625 volts. The theoretical efficiencies in the example are about 35%, compared with about 25% for a standard photovoltaic cell, having a single junction. Also included is a method of manufacturing such a cell.

14 Claims, 6 Drawing Figures

Metal/Polymer/Semiconductor type-n

Metal/Polymer/Semiconductor type-p

DOUBLE PHOTOELECTROCHEMICAL CELL FOR CONVERSION OF SOLAR ENERGY TO ELECTRICITY

BACKGROUND OF THE INVENTION

1. Field of the Invention

The invention relates generally to photovoltaic cells and methods of their manufacture, and more particularly to such cells employing thin film polymer electrolytes and methods of their manufacture.

2. Description of the Prior Art

Photovoltage or the photovoltaic effect may be defined as the conversion of light or electromagnetic photons to electrical energy by a material. Becquerel in 1839 was the first to discover that a photovoltage developed when light was shining on an electrode in an electrolyte solution. Nearly half a century elapsed before this effect was observed in a solid, namely in selenium. Again, many years passed before successful devices such as the photoelectric exposure meter, were developed. Radiation is absorbed in the neighborhood of a potential barrier, usually a pn junction or a metal-semiconductor contact or junction, giving rise to separate electron hole pairs which create a potential.

Photovoltaic cells have found numerous applications in electronics and aerospace, notably in satellites for instrument power, and powering communications apparatus in remote locations.

Intensive research in underway in the last decade to improve the production of these cells, e.g. (1) increasing the practical efficiency in order to approach the theoretical efficiency, (2) decreasing production costs, and (3) to find new materials and combinations.

Intensive interest in alternative energy sources and particularly in solar energy has increased because of political and economic impetus. Traditional sources of inexpensive energy are rapidly disappearing. Political instability, price/supply fixing by certain governments, and environmental concerns, dictate the search for new energy sources. Thus the present intense interest in solar energy. Each country has its own sunlight supply, and the United States has an ample supply. Ecologically, solar cells are a non-polluting clean source of energy. Solar energy in our forseeable future for many generations is limitless and non-depletable. One application of solar energy to which the present invention is directed is the direct conversion of electromagnetic radiation, particularly sunlight, to electricity.

Two of the classical goals of any photovoltaic cell are efficiency, and higher output voltage. Most prior art cells have a theoretical efficiency of about 25%. The cells of the present application approach 35%. The prior art voltage ranges from 0.2 to 0.5 volts per cell; the inventor's cells are approximately 0.625 volts.

Further, some prior art cells require that they be oriented so that the incident light is perpendicular to the face of the cell. In the present invention, while this is desirable, it is not essential, and they may operate at an angle from the perpendicular.

The present invention offers the possibility of ease of manufacture, attendant low cost, and manufacturing large surface areas with good quality and at a low cost.

The present invention is corrosion free. A reduction-oxidation couple in water has a photocorrosion resulting from an interaction between the water and semiconductors. The present invention by using a polymer matrix avoids photocorrosion and the attendant problems.

An object of the present invention is to provide a novel, double photoelectric cell for conversion of solar energy to electricity.

Another object of the invention is to provide a method for the manufacture of double photoelectrochemical cells. A further object of the invention is to provide a half-double photochemical cell for the conversion of solar energy to electricity using a thin film polymer electrolyte.

A further object of the invention is to provide a new family of photoelectrochemical cells having a theoretical higher output efficiency and output voltage than is available from single cells.

Another object of the invention is to provide cells which are easy to manufacture and are stable in operation.

These and other objects and features of the invention will be more fully understood from the description of the embodiments which follow, but it should be understood that the invention is not limited to these embodiments and may find application as would be obvious to a man skilled in the art following the teachings of this application.

SUMMARY OF THE INVENTION

According to one aspect of the invention, there is provided a device for converting electromagnetic radiation, preferably sunlight, directly to electricity. It includes a first semiconductor having a first band gap and a second semiconductor adjacent thereto having a different band gap. A thin dry solid film polymer electrolyte separates the first and second conductors. The polymer electrolyte is a transparent, insulating polymer capable of transporting electric charges between the two semiconductors via the transport of ions and/or electrons due to electroactive molecules or ions dissolved in the polymer matrix or attached to the polymer backbone. One of the semiconductors is partially transparent and absorbs part of spectrum of the electromagnetic radiation or light; and the other absorbs other parts of the spectrum. Electrodes are connected to the semiconductors for collecting the output voltages from the semiconductors.

According to further aspects of the invention, there is provided a device having a transparent counter electrode of a thin film or grid, a thin film polymer electrolyte adjacent thereto; a semiconductor adjacent to said polymer electrolyte film and an electrode adjacent to the semiconductor.

According to another aspect of the invention, there is provided a method of manufacturing such cells.

DESCRIPTION OF THE PREFERRED EMBODIMENTS

Figure 1:
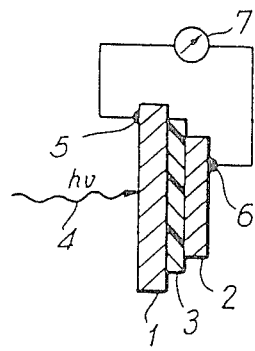
FIG. 1 is a schematic diagram of a double photoelectrochemical cell according to the invention.

In FIG. 1 there is schematically shown the photoelectrical cell having two semiconductors, 1 and 2, separated by a polymer electrolyte 3. Incoming electromagnetic radiation, for example, sunlight, is shown by an arrow 4. Electrodes 5 and 6 are connected to the semiconductors 1 and 2, respectively. The electrodes are connected by leads to a load shown here as a meter 7.

Figure 2:
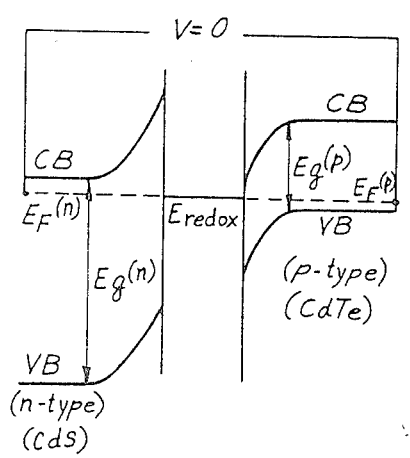
FIGS. 2 and 3 are band diagrams of the semiconductor elements of FIG. 1 when the cell is without incident radiation, and when it receives radiation respectively.
Figure 3:
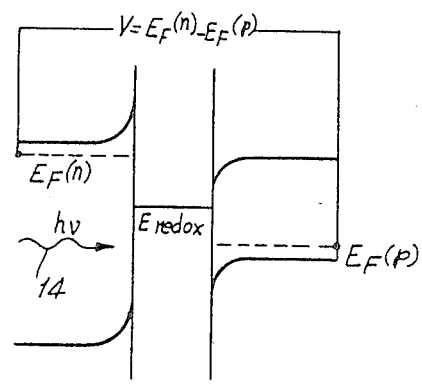

Semiconductor 1 is a thin film of cadmium sulfide, CdS, doped n-type, and is a thin film, approximately 1 micrometer thick. As shown in FIGS. 2 and 3, CdS n-type has a wide band gap. Semiconductor 2 is a thin film of cadmium telluride, CdTe, and is doped with a p-type impurity. CdTe p-type had a narrower band gap than that of CdS n-type as shown in FIGS. 2 and 3. The two semiconductors 1 and 2 face each other, and are in contact with and separated by the thin film polymer electrolyte 3.

The polymer electrolyte is an electron and/or ion-exchange polymer, for example, a polymer matrix containing a redox reduction-oxidation couple. The polymer matrix is a polyalkene oxide. Polyethylene oxide has been tried and operated satisfactorily. Polyethylene glycol, polypropylene oxide, or polypropylene glycol should also form suitable polymer matrixes. The redox couple is a polysulfide, e.g. polysulfide which has been used by the inventors is $Na_2S_4$. Other couples may be used. The polymer electrolyte film was made on the CDS 1 by evaporation from a methanol solution, i.e., polyethylene oxide with a methanol solvent. Contact with the CdTe semiconductor 2 was by contact and heating under vacuum with a pressure of 1 kg/cm$^2$.

Electrical leads shown schematically as 5 and 6 in FIG. 1 are connected to the walls of the semiconductor films 1 and 2. The leads may be any convenient or conventional transparent electrical lead. If the incident light 4 falls on the semiconductor 1, then lead 5 is a grid, or transparent electrode, at least for those portions of the spectrum which are absorbed by the semiconductors 1 and 2. Lead 6 may also be transparent to permit light to enter from both sides of the cell. Alternatively, electrode 6 may be reflective itself or have reflective material on the far side from the light 4, in which case any non-absorbed radiation would be reflected and further absorbed. Electrodes 5 and 6 are connected to leads shown schematically and which in turn are connected to a load, shown here as voltmeter 7. A substrate (not shown) is provided as well as suitable mechanical protection for the electrodes and semiconductors. The substrate and protective film must be transparent over that portion of the cell through which light passes. Glass is the usual substrate, although plastic substrate in encapsulation may also be used. The electrode facing the incident light may have antireflection coating.

FIGS. 2 and 3 are band diagrams of the device of FIG. 1. FIG. 2 shows the device in the dark, and FIG. 3 the band diagram under illumination. The band gap of CdS n-type is typically 2.4 eV. The band gap of CdTe p-type is typically 1.45 eV. At dark, the Fermi level $E_F$ is the same. Under illumination as shown in FIG. 3 with the incident illumination shown schematically by the wavy line with the legend 14, the Fermi levels shift, and there is a net potential across the semiconductors of $V = E_F^{(n)} - E_F^{(p)}$. The two semiconductors have different band gaps. There is thus a multi-color cell which divides the solar spectrum into two parts, with the short wavelengths absorbed by the wide band gap semiconductor 1, and the long wavelengths absorbed by the narrow band gap semiconductor 2. The polymer electrolyte 3 permits the flow of charge there-across, and the two junctions 1–2 and 2–3 are in series. The maximum theoretical efficiency of the cell is about 35%. This can be compared with the best single junction photovoltaic cell commonly used having a theoretical efficiency of 25%, that being for gallium arsenide. The theoretical efficiency of a cadmium telluride cell by itself of 25%; and a cadmium sulfide cell by itself of 16%.

The open circuit voltage measured by volt meter 7 reads 0.625 volts using 100 milliwatt/cm$^2$ Xenon light source.

Figure 4:
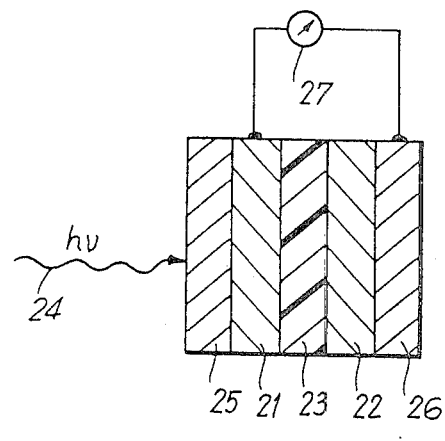
FIG. 4 is a schematic diagram of a second embodiment of the invention showing a half cell.

Turning now to FIG. 4, there is shown an electrolytic Schottky barrier device or "half-cell" of the invention. In this embodiment there is a single junction. The embodiment of FIG. 4 is similar to the one of FIG. 1 except that one of the semiconductors is replaced by a metal or counter electrode 21. Electrode 21 is a thin metal film or grid which is semi-transparent or other transparent counter electrode, e.g. tin-oxide or indium-tin-oxide, and preferably completely transparent to that spectrum which is to be absorbed. A semiconductor layer 22 may be either p-type or n-type. A polymer electrolyte 23 separates the transparent counter electrode 21 and the semiconductor 22. A transparent cover for example, glass 25 or an antireflection coating is on an outside face of the metal electrode 21. A conducting base electrode 26 is on an outside face of the semiconductor 22. Light 24 passes through the transparent cover 25, transparent electrode 21, and electrolyte 23 and is absorbed by the semiconductor 22. The device of FIG. 4 is an electrolytic Schottky barrier cell and may have a higher open circuit voltage than that of the solid state junction cells.

Figure 5:
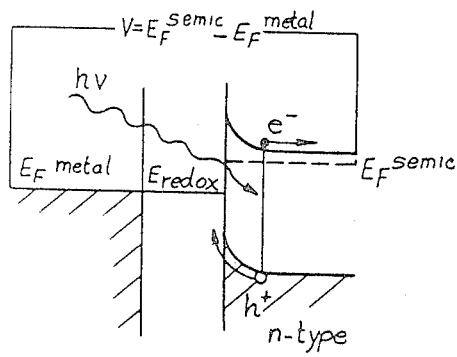
FIGS. 5 and 6 are band diagrams of metal polymer semiconductor devices of FIG. 4.
Figure 6:
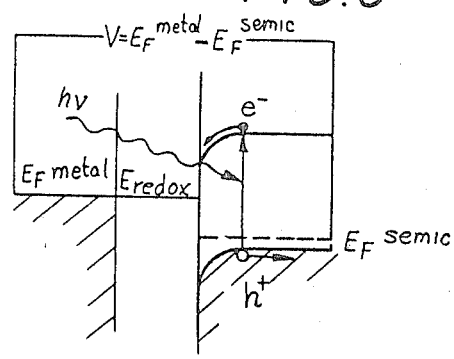

The band diagram of the device of FIG. 4 is shown in FIGS. 5 and 6 with n- and p-type semiconductors, respectively; and with light impinging upon the semiconductors. The flow and direction of holes, h+, and electrons, e−, are shown in the semiconductor region. The voltage across the electrodes 21, 26 at open circuit is $V = E_F^{semi} - E_F^{metal}$ for the n-type semiconductor, and $V = E_F^{metal} - E_F^{semi}$ for the p-type.

Thus, there has been shown and described a novel photovoltaic cell using a polymer electrolyte. Polymer electrolytes are a new concept in photoelectrochemical cells for the conversion of solar energy to electricity. It is envisioned that this is a basic invention of such devices and the invention should not be narrowly interpreted during the life of any patent. Those following the teaching of this application will no doubt be led to other and additional polymer electrolytes and other semiconductors than those specifically described herein (which are the ones that have been employed by the inventor in his research to date).

I claim:

1. A multiple junction photoelectric device for converting incident electromagnetic radiation into electricity comprising a first semiconductor having a first band gap and a first conductivity type; a second semiconductor having a different band gap and opposite conductivity type; a thin dry solid film polymer electrolyte between said first and second semiconductors; said polymer electrolyte being transparent, and capable of transporting electric charges between the two semiconductors; one of said semiconductors being partially transparent, absorbing part of the spectrum of incident radiation and the other absorbing other parts of the spectrum of radiation.

2. A device according to claim 1 wherein said polymer electrolyte is a polymer matrix containing a reduction-oxidation couple.

3. A device according to claim 2 wherein said polymer matrix is a polyalkene oxide.

4. A device according to claim 3 wherein the polyalkene oxide is of the group of polyethylene oxide, polyethylene glycol, polypropylene oxide, and polypropylene glycol.

5. A device according to claim 2 wherein said polymer matrix is polyethylene oxide.

6. A device according to claim 2, or 3, or 4, or 5 wherein said reduction-oxidation couple is a polysulfide.

7. A device according to claim 6 wherein said polysulfide is $Na_2S_4$.

8. A device according to claim 1 further comprising electrode means connected to each of said semiconductors for collecting output voltages from said semiconductors.

9. A device according to claim 1 wherein said semiconductors are II–VI or III–V semiconductors.

10. A device according to claim 9 wherein said first and second semiconductors are CdS and CdTe.

11. A device according to claim 10 wherein said CdS semiconductor is n-type, and said CdTe semiconductor is p-type.

12. A device according to claim 1 wherein said one semiconductor has a wide band gap and is to receive the incident radiation thereby absorbing that part of the spectrum with short wavelengths, and the remaining portion of the incident radiation passing through the transparent polymer electrolyte to the second semiconductor which has a narrow band gap and absorbs long wavelength radiation.

13. A device according to claim 12 wherein said first semiconductor is about 1 micrometer thick.

14. A device according to claim 12 wherein said device further comprises a transparent substrate adjacent to, and on which is mounted, said first semiconductor.

* * * * *